United States Patent
Takahashi et al.

(10) Patent No.: US 11,510,252 B2
(45) Date of Patent: Nov. 22, 2022

(54) TERMINAL, RADIO COMMUNICATION METHOD, BASE STATION, AND SYSTEM

(71) Applicant: NTT DOCOMO, INC., Tokyo (JP)

(72) Inventors: Hideaki Takahashi, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/257,351

(22) PCT Filed: Jul. 4, 2018

(86) PCT No.: PCT/JP2018/025403
§ 371 (c)(1),
(2) Date: Dec. 31, 2020

(87) PCT Pub. No.: WO2020/008574
PCT Pub. Date: Jan. 9, 2020

(65) Prior Publication Data
US 2021/0321462 A1  Oct. 14, 2021

(51) Int. Cl.
*H04W 74/08* (2009.01)
*H04W 74/00* (2009.01)
*H04W 74/02* (2009.01)

(52) U.S. Cl.
CPC ..... *H04W 74/0841* (2013.01); *H04W 74/006* (2013.01); *H04W 74/02* (2013.01); *H04W 74/0891* (2013.01)

(58) Field of Classification Search
CPC .. H04B 7/0695; H04W 74/006; H04W 74/02; H04W 74/0833; H04W 74/0841; H04W 74/0891
See application file for complete search history.

(56) References Cited

U.S. PATENT DOCUMENTS

| 2014/0092827 A1* | 4/2014 | Jongren | H04L 25/0222 370/329 |
| 2015/0236801 A1* | 8/2015 | Sun | H04L 27/2613 370/328 |
| 2015/0382371 A1* | 12/2015 | Liu | H04B 7/0626 370/329 |

(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Kashif Siddiqui
(74) *Attorney, Agent, or Firm* — Osha Bergman Watanabe & Burton LLP

(57) ABSTRACT

A terminal is disclosed including a receiver a receiver that receives a radio resource control (RRC) reconfiguration message including comprising information regarding reconfiguration with synchronization; and a processor that monitors a quasi co-location of a demodulation reference signal antenna port for a downlink control channel in a control resource set based on information regarding random access resources within the information regarding the reconfiguration with synchronization. In other aspects, a radio communication method, a base station, and a system are also disclosed.

7 Claims, 10 Drawing Sheets

(56) References Cited

U.S. PATENT DOCUMENTS

2018/0287681 A1* 10/2018 Chen ..................... H04L 5/0057
2020/0036555 A1*  1/2020 Davydov .............. H04L 5/0094
2020/0178148 A1*  6/2020 Lee ........................ H04L 5/001

OTHER PUBLICATIONS

International Search Report issued in International Application No. PCT/JP2018/025403, dated Sep. 25, 2018 (5 pages).
Written Opinion issued in International Application No. PCT/JP2018/025403; dated Sep. 25, 2018 (3 pages).
Office Action issued in Chilean Application No. 202003448 dated Feb. 18, 2022 (22 pages).
Extended European Search Report issued in Application No. 18925538.3 dated Jan. 21, 2022 (7 pages).
Ericsson, "Remaining details of beam management", 3GPP TSG-RAN WG1 #91, R1-1721366, Reno, USA, Nov. 27-Dec. 1, 2017 (16 pages).
Ericsson, "On UL beam indication", 3GPP TSG-RAN WG1 #90bis, R1-1718747, Prague, Czech Republic, Oct. 9-13, 2017 (4 pages).

* cited by examiner

MIB
MIB ::= SEQUENCE {
...
pdcch-ConfigSIB1       INTEGER (0..255),
...
}

MOST SIGNIFICANT 4 BITS

| Index | SS/PBCH block and control resource set multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

TERMINAL, RADIO COMMUNICATION METHOD, BASE STATION, AND SYSTEM

TECHNICAL FIELD

The present disclosure relates to a user terminal in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10 to Rel. 14) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In an initial access in NR, at least one of detection of a synchronization signal block (SSB), acquisition of broadcast information (e.g., master information block (MIB)) transmitted by a broadcast channel (also referred to as a "PBCH (Physical Broadcast Channel)," "P-BCH," and so on), and establishment of a connection by random access is performed.

Here, the SSB is a signal block including at least one of a synchronization signal (e.g., a primary synchronization signal (PSS), a secondary synchronization signal (SSS (Primary Synchronization Signal))) and a PBCH and is also referred to as a "SS/PBCH block," and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, it is studied that a user terminal determines quasi-co-location (QCL) about a control resource set (CORESET) (for example, CORESET #0) configured based on an MIB or system information block (SIB) 1, based on an SSB (or an index of the SSB).

However, it is assumed that the QCL relationship between the SSB and the CORESET changes by movement of the user terminal, and the like. Thus, it is desired that the QCL about the CORESET can be modified for the user terminal which has changed from an idle state (RRC_Idle) to a connected state (RRC_Connected) by an initial access.

However, at least one of a need to prescribe new signaling for the modification (for example, at least one of RRC (Radio Resource Control) signaling and MAC (Medium Access Control) signaling) and complexity of the processes in the user terminal might arise to modify the QCL about the CORESET.

The present disclosure has been made in view of the above, and an object of the present disclosure is to provide a user terminal that can control quasi-co-location about a CORESET appropriately.

Solution to Problem

A user terminal according to one aspect of the present disclosure includes: a receiving section that receives an RRC (Radio Resource Control) reconfiguration message including information about reconfiguration with sync; and a control section that controls quasi-co-location about a control resource set, based on information about resources for random access in the information about the reconfiguration.

Advantageous Effects of Invention

According to one aspect of the present disclosure, quasi-co-location about the CORESET can be controlled appropriately.

DESCRIPTION OF EMBODIMENTS

In an initial access in NR, at least one of detection of a synchronization signal block (SSB), acquisition of broadcast information (e.g., master information block (MIB)) transmitted by a broadcast channel (also referred to as a "PBCH (Physical Broadcast Channel)," "P-BCH," and so on), and establishment of a connection by random access is performed.

Specifically, the user terminal detects an SSB, and determines a control resource set (CORESET) for system information (for example, SIB1 (System Information Block 1), RMSI (Remaining Minimum System Information)), based on information (for example, MIB) transmitted on the PBCH.

The CORESET is allocation candidate regions of a downlink control channel (for example, PDCCH (Physical Downlink Control Channel)). The "CORESET for SIB1" is a CORESET where the PDCCH (or DCI) is allocated while used for scheduling of a downlink shared channel (for example, PDSCH (Physical Downlink Shared Channel)) for transmitting SIB1. The "CORESET for SIB1" is also referred to as "CORESET #0," "controlResourceSetZero," "common CORESET," "common CORESET #0," a "cell specific CORESET," and the like.

One or more search spaces may be associated with CORESET #0. The search spaces may include at least one of a search space (common search space (CSS)) used for monitoring of (cell specific) DCI common to one or more user terminals and a search space (UE specific search space (USS)) used for monitoring of user terminal specific DCI.

For example, a search space (or a set of search spaces) associated with CORESET #0 may include at least one of the following:
search space #0 (searchSpaceZero);
search space for SIB1 (type 0 PDCCH common search space, searchSpaceSIB);
search space for OSI (Other System Information) (type 0A PDCCH common search space, searchSpace-OSI);
search space for paging (type 2 PDCCH common search space, pagingSearchSpace);
search space for random access (type 1 PDCCH common search space, ra-SearchSpace).

The user terminal may configure CORESET #0, based on an index (also referred to as "pdcch-ConfigSIB1," "RMSI-PDCCH-Config," and the like) in the MIB.

Figure 1:
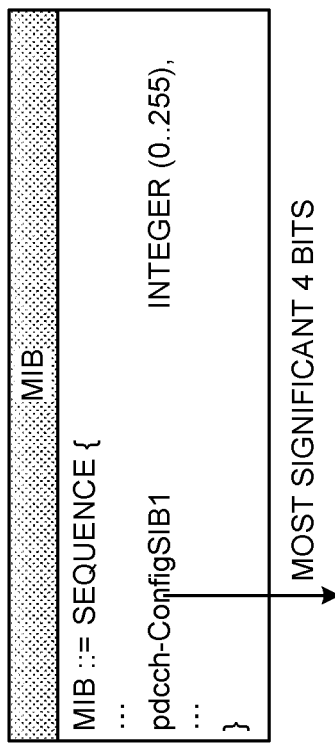
FIG. 1 is a diagram to show an example of a configuration of CORESET #0 based on an MIB.

FIG. 1 is a diagram to show an example of a configuration of CORESET #0 based on an MIB. As shown in FIG. 1, the MIB may include a certain bit number (for example, 8 bits) of pdcch-ConfigSIB1. The user terminal configures at least one of frequency domain resources (also referred to as a "bandwidth" or "resource blocks (RBs, PRBs (Physical Resource Blocks))," the "number of RBs," and the like) and time domain resources (also referred to as a "period" or "symbols," the "number of symbols," and the like) allocated to CORESET #0, based on bit values of at least one of pdcch-ConfigSIB1.

For example, in FIG. 1, the user terminal may determine the number of RBs ($N^{CORESET}_{RB}$) the number of symbol ($N^{CORESET}_{symb}$) an offset of RBs associated with an index indicated by 4 bits (for example, most significant 4 bits (MSB (Most Significant bit))) of pdcch-ConfigSIB1 for CORESET #0. The user terminal may determine search space #0, based on the rest of 4 bits (for example, least significant 4 bits (LSB (Least Significant bit))) of pdcch-ConfigSIB1.

Note that values associated with indices in FIG. 1 are only examples and are not limited to those illustrated. For example, each value may be modified based on at least one of the minimum channel bandwidth and the subcarrier spacing.

The bandwidth of CORESET #0 may be expressed in other words with a "bandwidth of a bandwidth part (BWP) for the initial access" (also referred to as an "initial BWP," and the like). Here, the BWP is a partial band in a carrier (a component carrier (CC), a cell, a serving cell, a system bandwidth), and the BWP may include a BWP for the uplink (uplink BWP) and a BWP for the downlink (downlink BWP).

For example, for the user terminal, one or more BWPs (at least one of one or more uplink BWPs and one or more downlink BWPs) may be configured, and at least one of configured BWPs may be activated. The activated BWP is also referred to as an "active BWP," and the like.

Alternatively, the user terminal may determine CORESET #0, based on a parameter (also referred to as "controlResourceSetZero," and the like) for CORESET #0 in SIB'. The controlResourceSetZero (for example, 4 bits) may be interpreted as corresponding bits (for example, most significant 4 bits) in pdcch-ConfigSIB1 in the MIB.

For example, the user terminal may determine the number of RBs ($N^{CORESET}_{RB}$), the number of symbols ($N^{CORESET}_{symb}$), an offset of RBs associated with an index indicated by controlResourceSetZero for CORESET #0 in FIG. 1.

Note that controlResourceSetZero in SIB1 may be configured for each serving cell or for each downlink BWP. Even if configuration information (pdcchConfigCommon) of the PDCCH in the initial BWP (BWP #0) includes controlResourceSetZero, the user terminal may acquire parameters for CORESET #0 regardless of the current active BWP.

The user terminal may assume that an antenna port of a demodulation reference signal (DMRS) of the PDCCH in CORESET #0 (or a search space associated with CORESET #0) configured based on the MIB or SIB1 and the detected SSB are in a relation of quasi-co-location (QCL) as above.

The QCL is an indicator to indicate statistical properties of at least one (channel/signal) of a channel and a signal. For example, a certain signal and another signal being in a relation of QCL means that it can be assumed that at least one of doppler shift, doppler spread, average delay, delay spread, spatial parameter (for example, spatial rx parameter) is the same (in QCL with respect to at least one of these) among these plurality of different signals.

Information about QCL may be referred to as a "state of TCI (Transmission Configuration Indication or Transmission Configuration Indicator) (TCI state (TCI-state))." The TCI state may be identified by a certain identifier (TCI state ID (TCI-StateId)).

As QCL, a plurality of types (QCL types) may be prescribed. For example, four QCL types A to D varying in parameters (or parameter sets) that can be assumed to be the same may be provided. The parameters are indicated in the following:
QCL type A: doppler shift, doppler spread, average delay and delay spread;
QCL type B: doppler shift and doppler spread;
QCL type C: doppler shift and average delay; and
QCL type D: spatial RX parameter.

Note that "the TCI states being the same or different between a plurality of channels/signals" is the same meaning as "a plurality of channels/signals being transmitted or received by using different beams or the same beam (or transmission and reception point (TRP))." When the TCI states are different, the user terminal can assume that channels/signals are transmitted by different beams (TRPs). The "TRP" may be expressed in other words with a "network," a "radio base station," an "antenna apparatus," an "antenna panel," a "serving cell," a "cell," a "component carrier (CC)" or a "carrier," and the like.

As above, in a case that the TCI state of CORESET #0 is not modified after the TCI state of CORESET #0 is determined at the time of the initial access, communication may not be performed appropriately.

For example, in a case that the TCI state of CORESET #0 is not modified in a case that the TCI state of another CORESET is modified, the other CORESET and CORESET #0 may not be configured to the same time domain resources (for example, symbols). This is because the user terminal cannot monitor PDCCHs of different analog beams at the same time.

In a case that the TCI state of CORESET #0 has become not appropriate by movements of the user terminal, and the like, it is assumed that an inappropriate TCI state is used even though there is a more appropriate TCI state (beam, and the like). In this case, information (for example, SIB1) based on the PDCCH in CORESET #0 may not be received appropriately in the case that the TCI state of CORESET #0 is not modified.

Similar problems can also occur for the TCI state of CORESET #0 determined not only at the time of the initial access but also at the time of handover or addition of a cell group (secondary cell group (SCG)) including a primary secondary cell (PSCell (Primary Secondary Cell Group)).

Thus, various kinds of methods to modify the TCI state of CORESET #0 for the user terminal in the connected state (for example, RRC connected state) after the TCI state of CORESET #0 is determined have been studied.

However, at least one of a need to prescribe new signaling for the modification (for example, at least one of RRC signaling and MAC signaling) and complexity of the processes in the user terminal might arise to modify the TCI state of the CORESET #0.

Then the innovators have focused on the point that the TCI state of CORESET #0 can be modified without prescribing new signaling for modifications of the TCI state of CORESET #0 or while preventing the complexity of the processes in the user terminal by utilizing signaling of reconfiguration with sync and resulted in the present invention.

The present embodiment will be described in detail with reference to the drawings as follows.

In the present embodiment, the "reconfiguration with sync" may be a random access procedure with reconfiguration of RRC and, for example, may be performed at the time of handover or addition of a SCG. In the reconfiguration with sync, when the user terminal receives an RRC reconfiguration (RRCReconfiguration) message including a parameter (reconfigurationWithSync) for the reconfiguration with sync, the user terminal may perform at least one of the following operations:
  initiating synchronization of DL of a target special cell (SpCell) and acquiring the MIB of the special cell;
  resetting the MAC entity of a cell group;
  configuring lower layers according to the common configuration information (also referred to as "spCellConfigCommon," "ServingCellConfigCommon," and the like) about the special cell in reconfigurationWithSync;
  random access procedure based on the configuration information (rach-ConfigDedicated) about the random access included in reconfigurationWithSync;
  measurement based on the configuration information (MeasConfig) for the measurement in the RRC reconfiguration message.

Here, the "special cell (SpCell)" is a primary cell (PCell) in a master cell group (MCG) or a PSCell in a SCG in dual connectivity (DC), or may be a PCell except for DC.

Figure 2:
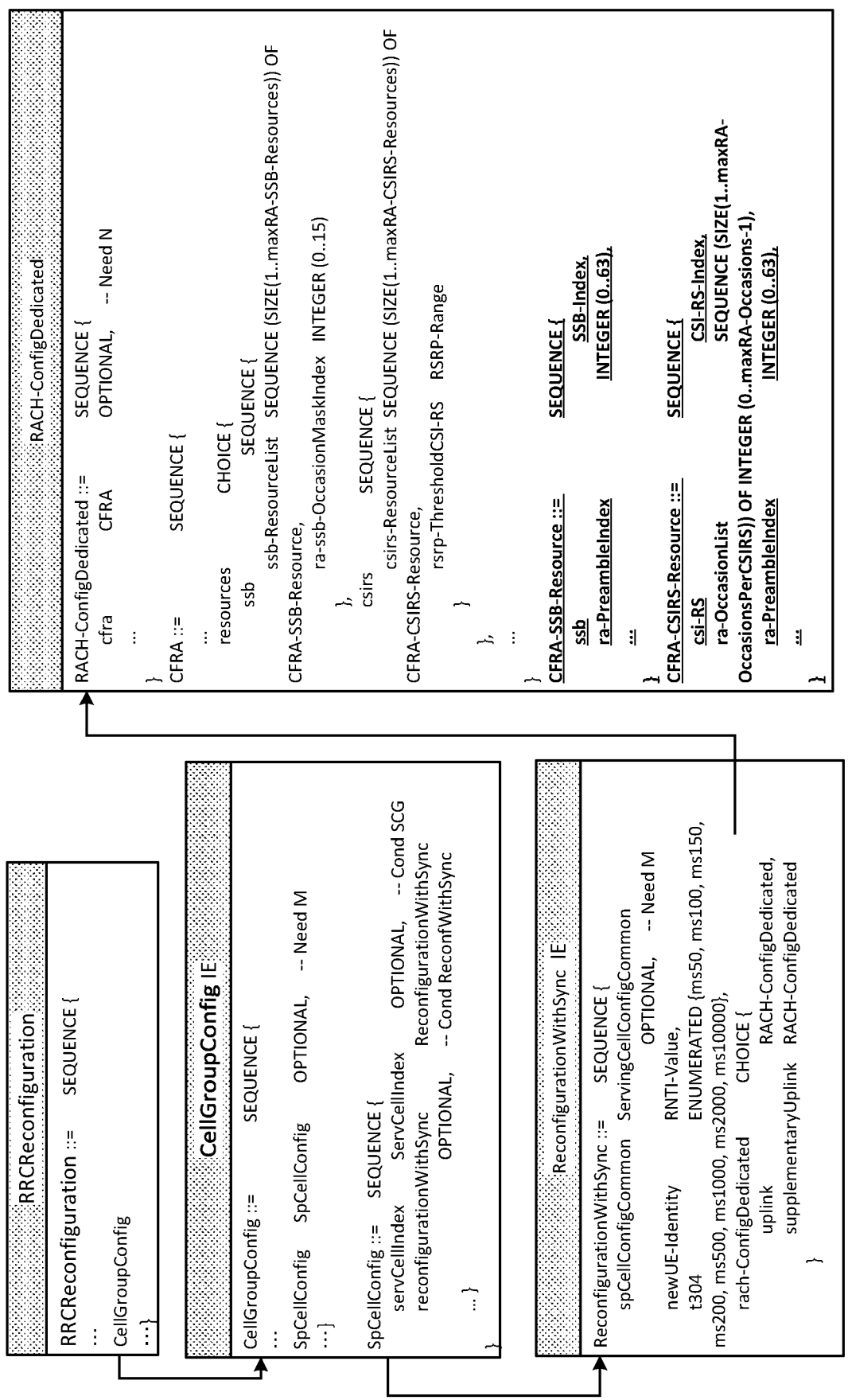
FIG. 2 is a diagram to show an example of an RRC reconfiguration message used in reconfiguration with sync.

FIG. 2 is a diagram to show an example of an RRC reconfiguration message according to the present embodiment. As shown in FIG. 2, the RRC reconfiguration message may include configuration information (CellGroupConfig) for each cell group. A cell group may include the above-mentioned MCG and SCG.

CellGroupConfig for each cell group may include configuration information (SpCellConfig) about the special cell. SpCellConfig may include the above-described reconfigurationWithSync.

reconfigurationWithSync may include at least one of the above-described spCellConfigCommon, an identifier of the user terminal (for example, a value of a radio network temporary identifier (RNTI)), configuration information (rach-ConfigDedicated) about the random access in the uplink or SUL (SupplementaryUplink), and the like.

rach-ConfigDedicated may include parameters (cfra, CFRA) for the random access (for example, contention free random access (CFRA)). In a case that the rach-ConfigDedicated is not configured, the user terminal may perform contention based random access (CBRA).

The CFRA may include information (also referred to as "ssb," "ssb-ResourceList, CFRA-SSB-Resource," and the like) about resources (SSB resources) for one or more SS/PBCH blocks (SSBs) or information (also referred to as "csirs," "csirs-ResourceList," "CFRA-CSIRS-Resource," and the like) about resources (CSI-RS resources) for one or more channel state information-reference signals (CSI-RS) as information (resources) about resources for the random access (for example, the CFRA).

Each CFRA-SSB-Resource may include an index of the SSB (SSB index) and the index (ra-PreambleIndex) of the preamble (RA preamble) for the random access.

Each CFRA-CSIRS-Resource may include an index of the CSI-RS resources (CSI-RS index) and an index of the RA preamble (ra-PreambleIndex).

Note that the layered structure of the RRC reconfiguration message shown in FIG. 2 is only an example and is not limited to this.

The user terminal may determine the TCI state of CORESET #0, based on information (for example, the above-described CFRA-SSB-Resource or CFRA-CSIRS-Resource) about resources for the random access in reconfigurationWithSync.

(First Aspect)

In a first aspect, a case that the RA preamble is associated with the SSB in "reconfiguration with sync" will be described.

In the first aspect, reconfigurationWithSync in the RRC reconfiguration message may include information (the above-described CFRA-SSB-Resource) to associate each SSB index with an index of each RA preamble as information about the resources for the random access.

In the first aspect, the user terminal may assume that an antenna port of a DMRS of the PDCCH in CORESET #0 is quasi-co-located with a certain SSB specified by CFRA-SSB-Resource. The antenna port of the DMRS may be one or more antenna ports, and may be referred to as an "antenna port group," a "DMRS port group," and the like.

Figure 3:
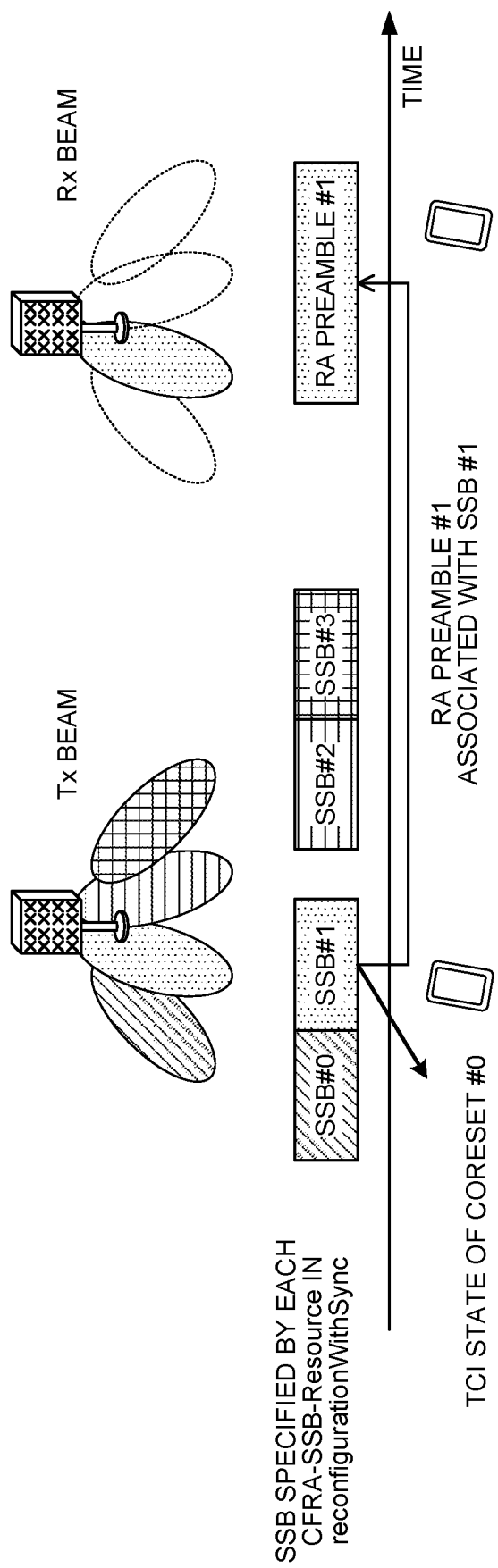
FIG. 3 is a diagram to show an example of determination of a TCI state of CORSET #0 according to a first aspect.

FIG. 3 is a diagram to show an example of determination of a TCI state of CORSET #0 according to the first aspect. In FIG. 3, an example of a case that CFRA-SSB-Resource is included in information (resources) about the resources for the CFRA, in other words, a case that the RA preamble is associated with the SSB is shown.

As shown in FIG. 3, each SSB of a plurality of SSB indices may be transmitted by using different beams (also referred to as "TCI states" or "SSB resources," and the like) in the time direction.

In FIG. 3, in a case that a network (for example, base station, TRP or gNB (gNodeB), and the like) makes the user terminal in the connected state modify the TCI state of CORESET #0, the network includes, to transmit, an SSB index associated with an index of each RA preamble in each CFRA-SSB-Resource in reconfigurationWithSync in the RRC reconfiguration message transmitted in the "reconfiguration with sync."

For example, in FIG. 3, the network may transmit including four CFRA-SSB-Resource which respectively include SSB indices #0 to #3 and indices of the RA preamble associated with SSB indices #0 to #3, in reconfigurationWithSync in the RRC reconfiguration message. The user terminal receives four CFRA-SSB-Resource including SSB indices #0 to #3 and the indices of the RA preamble respectively associated with SSB indices #0 to #3.

In the "reconfiguration with sync," the user terminal selects (detects) the certain SSB from one or more SSBs specified in CFRA-SSB-Resource. For example, in FIG. 3, the user terminal may select (detect) SSB #1, based on reception characteristics (for example, received power) from SSBs #0 to #3.

The user terminal may transmit RA preamble #1 associated with selected (detected) SSB #1. The network can control received beam of RA preamble #1 appropriately by using RA preamble #1 associated with SSB #1.

The user terminal assumes the TCI state of CORESET #0, based on the detected SSB (SSB index). In other words, the user terminal assumes that the detected SSB (SSB index) is quasi-co-located with the antenna port of the DMRS of the PDCCH in CORESET #0 (or the search space associated with CORESET #0). For example, the QCL may relate to average gain, QCL type A, or QCL type D.

In other words, the user terminal may assume that the detected SSB (SSB index) is quasi-co-located with the antenna port of the DMRS of the PDCCH in CORESET #0 as the TCI state of CORESET #0.

In this way, in the first aspect, in the "reconfiguration with sync," the SSB index specified by CFRA-SSB-Resource in reconfigurationWithSync in the RRC reconfiguration message is used not only for the specification of the RA preamble, but also for the modifications of the TCI states of CORESET #0 of the user terminal in the connected state.

The CFRA-SSB-Resource is already prescribed for other applications (for example, optimization of the received beam of the RA preamble in the network, and the like) except the modifications of the TCI states of CORESET #0 for signaling of the "reconfiguration with sync."

Therefore, by assuming the TCI state of CORESET #0, based on the detected SSB from one or more SSBs specified in the CFRA-SSB-Resource, the TCI state of CORESET #0 can be modified without prescribing new signaling. The complexity of the processes of the user terminal with the modifications of the TCI states of the CORESET #0 can be prevented.

(Second Aspect)

In a second aspect, a case that the RA preamble is associated with the CSI-RS resources in "reconfiguration with sync" will be described.

In the first aspect, reconfigurationWithSync in the RRC reconfiguration message may include information (the above-described CFRA-CSIRS-Resource) to associate each CSI-RS index with an index of each RA preamble as information about the resources for the random access.

In the first aspect, the user terminal may assume that an antenna port of a DMRS of the PDCCH in CORESET #0 is quasi-co-located to the SSB quasi-co-located with the certain CSI-RS resources specified by CFRA-CSIRS-Resource. The antenna port of the DMRS may be one or more antenna ports, and may be referred to as an "antenna port group," a "DMRS port group," and the like.

Figure 4:
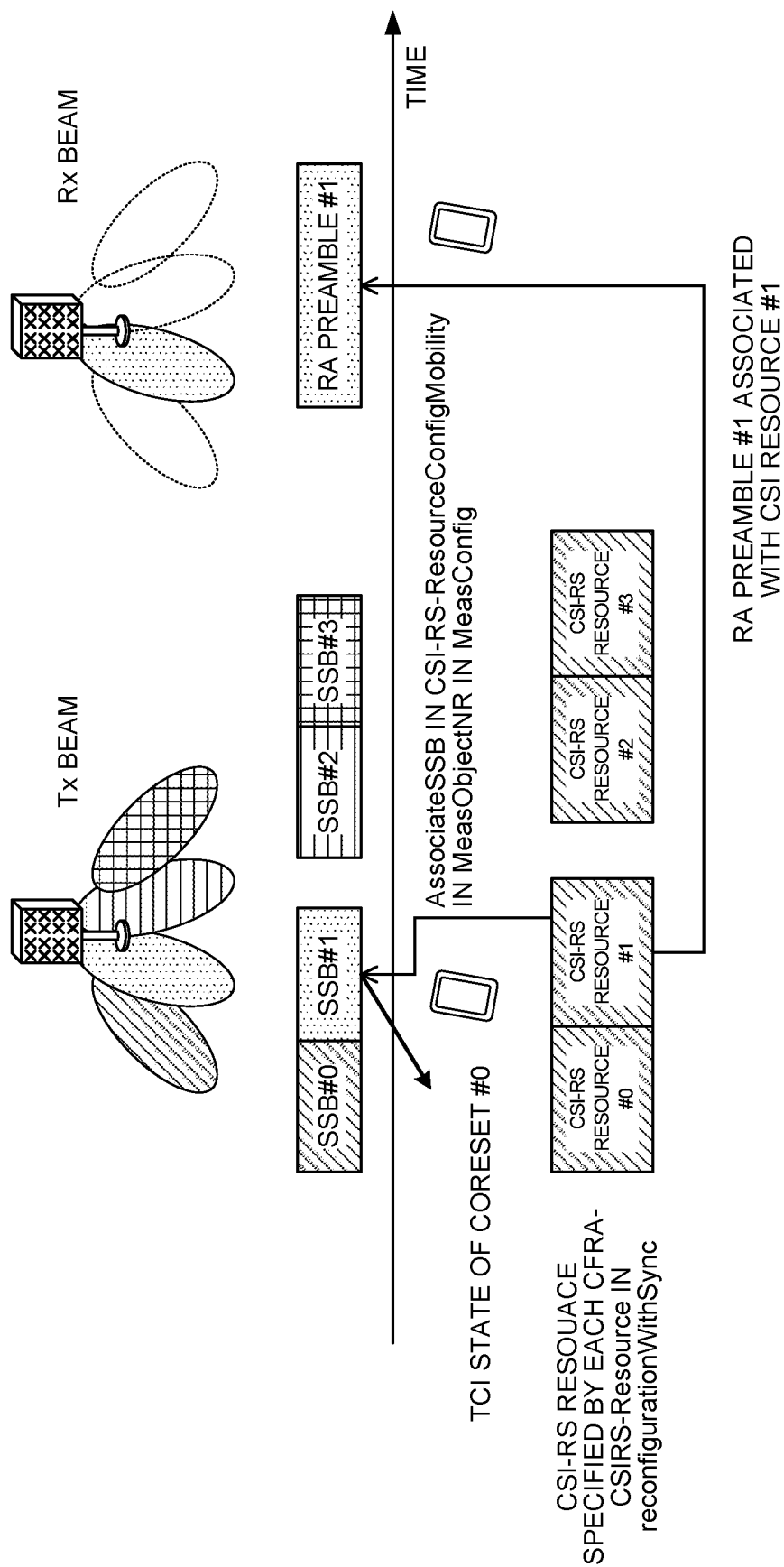
FIG. 4 is a diagram to show an example of determination of a TCI state of CORSET #0 according to a second aspect.

FIG. 4 is a diagram to show an example of determination of a TCI state of CORSET #0 according to the second aspect. In FIG. 4, an example of a case that CFRA-CSIRS-Resource is included in information (resources) about the resources for the CFRA, in other words, a case that the RA preamble is associated with the CSI-RS is shown.

Similar to FIG. 3, in FIG. 4, each SSB of a plurality of SSB indices may be transmitted by using different beams (also referred to as "TCI states" or "SSB resources," and the like) in the time direction. In FIG. 4, differences from FIG. 3 will be mainly described.

In FIG. 4, in a case that the network (for example, base station, TRP or gNB, and the like) makes the user terminal in the connected state modify the TCI state of CORESET #0, the network includes, to transmit, an CSI-RS index associated with an index of each RA preamble in each CFRA-CSIRS-Resource in reconfigurationWithSync in the RRC reconfiguration message transmitted in the "reconfiguration with sync."

For example, in FIG. 4, the network may include, to transmit, four CFRA-CSIRS-Resources which respectively include CSI-RS index #0 to #3 and indices of the RA preamble respectively associated with the CSI-RS index #0 to #3, in reconfigurationWithSync in the RRC reconfiguration message. The user terminal receives four CFRA-SSB-Resource including CSI-RS indices #0 to #3 and the indices of the RA preamble respectively associated with the CSI-RS indices #0 to #3.

The RRC reconfiguration message transmitted in the "reconfiguration with sync" may include configuration information (MeasConfig) for measurement. MeasConfig may include information (also referred to as "MeasObjectNR," "ReferenceSignalConfig," "CSI-RS-ResourceConfigMobility," and the like) about measurement (at least one of intra-frequency measurement and inter-frequency measurement) using one or more CSI-RSs.

Each CSI-RS-ResourceConfigMobility may include information (associatedSSB) for associating the CSI-RS index, the CSI-RS (or CSI-RS resources), and the SSB (SSB index), and the like. For example, associatedSSB in each CSI-RS-ResourceConfigMobility may include information (isQuasiColocated) to indicate whether the SSB index associated with the CSI-RS index and the CSI-RS resources of the CSI-RS index are quasi-co-located (QCLed) with the SSB of the SSB index in spatial parameters.

For example, in FIG. 4, associatedSSB in four CSI-RS-ResourceConfigMobility may indicate that CSI-RS resources #0 to #3 are associated with SSBs #0 to #3, respectively, and CSI-RS resources #0 to #3 are in QCL with SSBs #0 to #3, respectively.

Note that, in FIG. 4, CSI-RS resources #0 to #3 are multiplexed in the time domain, but may be multiplexed in at least one of the frequency domain and the time domain without being limited to this.

In the "reconfiguration with sync," the user terminal selects (detects) the certain CSI-RS resource from the CSI-RS resources specified in CFRA-CSIRS-Resource. For example, in FIG. 4, the user terminal selects (detects) CSI-RS resource #1, based on reception characteristics (for example, received power, RSRP (Reference Signal Received Power)) from CSI-RSs #0 to #3.

The user terminal determines SSB #1 which is in a relation of QCL with selected (detected) CSI-RS resource

1, based on the above-described associatedSSB. The user terminal may transmit RA preamble #1 associated with CSI-RS index #1, based on the above-described CFRA-CSIRS-Resource. The network can control received beam of RA preamble #1 appropriately by using RA preamble #1 associated with CSI-RS resource #1.

The user terminal assumes the TCI state of CORESET #0, based on the SSB (SSB index) associated with CSI-RS resource #1. In other words, the user terminal assumes that the SSB (SSB index) associated with CSI-RS resource #1 is quasi-co-located with the antenna port of the DMRS of the PDCCH in CORESET #0 (or the search space associated with CORESET #0). For example, the QCL may relate to average gain, QCL type A, or QCL type D.

In other words, the user terminal may assume that CSI-RS resource #1 is quasi-co-located with the antenna port of the DMRS of the PDCCH in CORESET #0 as the TCI state of CORESET #0.

In this way, in the second aspect, in the "reconfiguration with sync," the CSI-RS index specified by CFRA-CSIRS-Resource in reconfigurationWithSync in the RRC reconfiguration message is used not only for the specification of the RA preamble, but also for the modifications of the TCI states of CORESET #0 of the user terminal in the connected state.

The CFRA-CSIRS-Resource is already prescribed for other applications (for example, optimization of the received beam of the RA preamble in the network, and the like) except the modifications of the TCI states of CORESET #0 for signaling of the "reconfiguration with sync." The above-described associatedSSB indicating the SSB that is in a relation of QCL with the CSI-RS resources specified by CFRA-CSIRS-Resource is already prescribed for signaling of the "reconfiguration with sync" for other applications (for example, CSI-RS based measurement, and the like) except the modifications of the TCI states of CORESET #0.

Therefore, by selecting the CSI-RS resource from one or more CSI-RS resources specified in the CFRA-CSIRS-Resource, and assuming the TCI state of CORESET #0, based on the SSB that is in a relation of QCL with the CSI-RS resource, the TCI state of CORESET #0 can be modified without prescribing new signaling. The complexity of the processes of the user terminal with the modifications of the TCI states of the CORESET #0 can be prevented.

(Radio Communication System)

Hereinafter, a structure of a radio communication system according to the present embodiment will be described. In this radio communication system, the radio communication method according to each embodiment of the present disclosure described above may be used alone or may be used in combination for communication.

Figure 5:
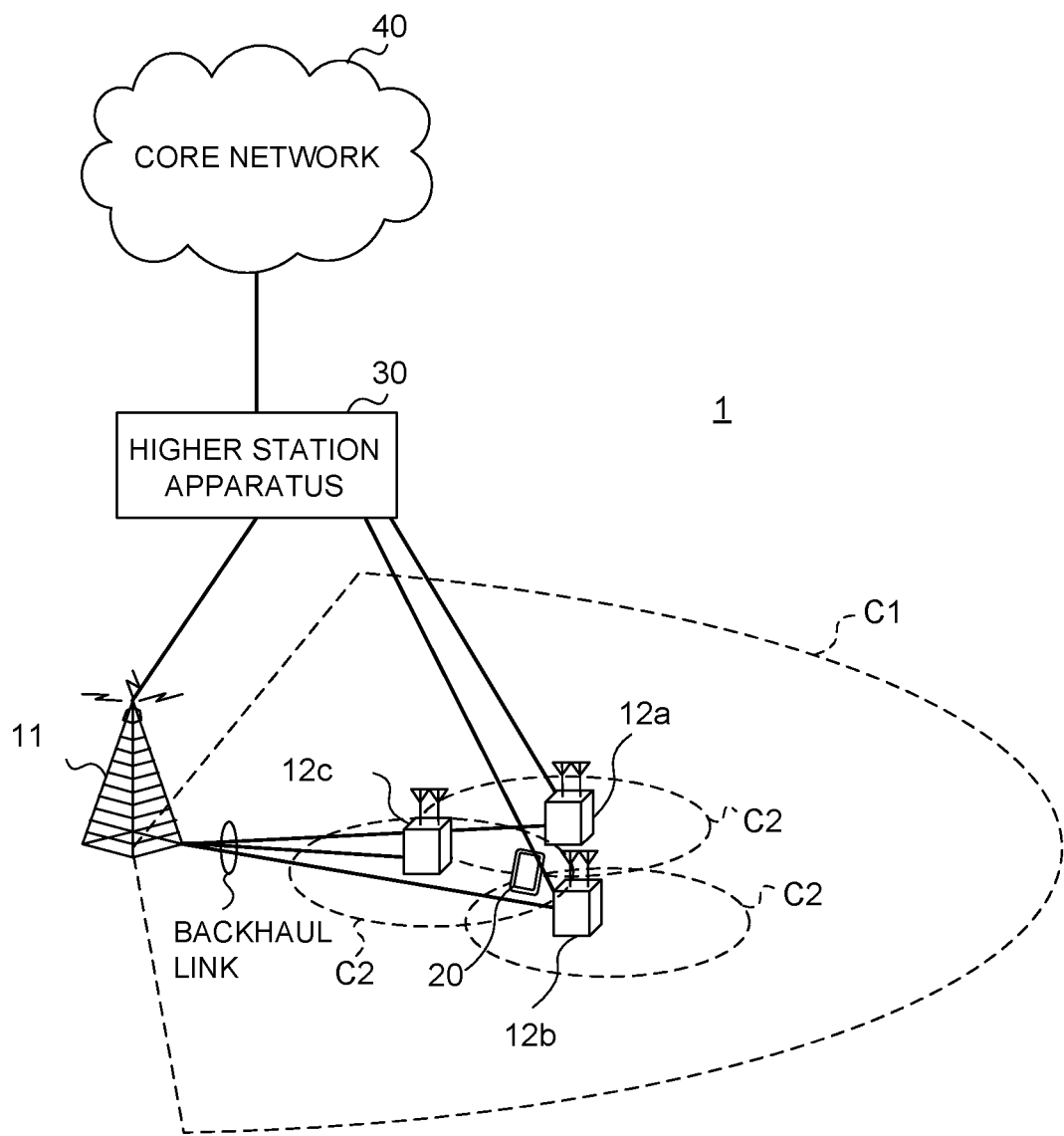
FIG. 5 is a diagram to show an example of a schematic structure of a radio communication system according to the present embodiment.

FIG. 5 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations,"

"HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or contiguous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that, the DCI scheduling DL data reception may be referred to as "DL assignment," and the DCI scheduling UL data transmission may be referred to as "UL grant."

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, delivery confirmation information, a scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 6:
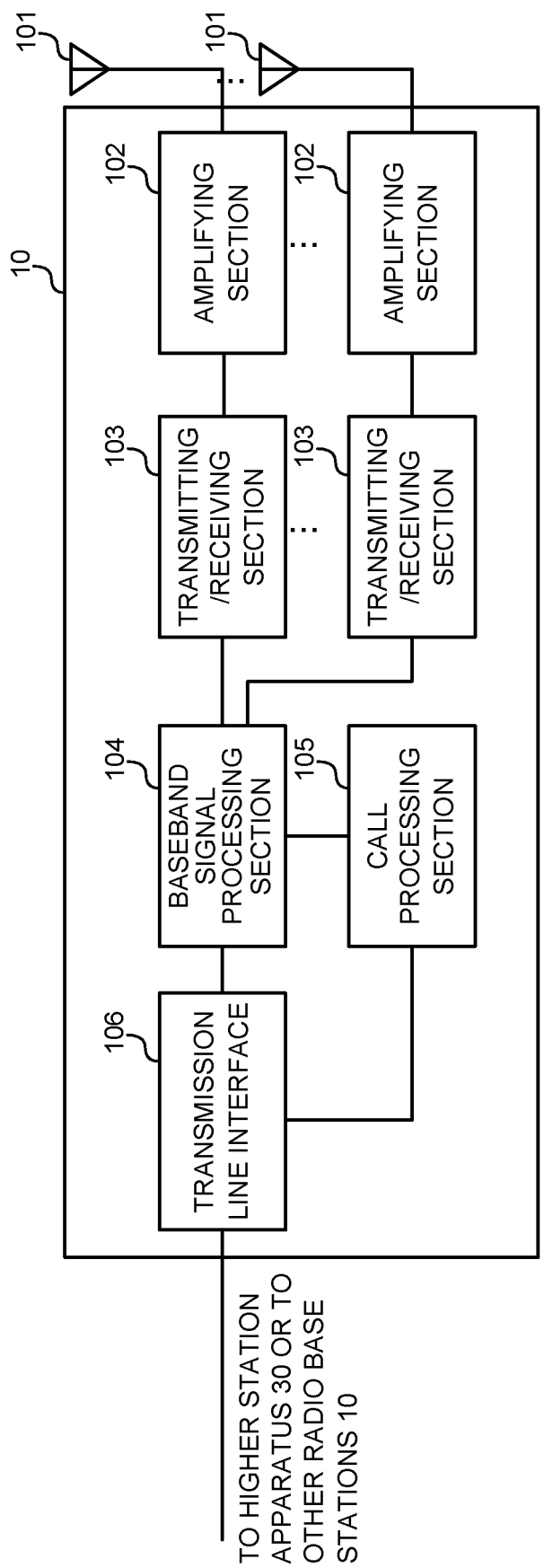
FIG. 6 is a diagram to show an example of an overall structure of the radio base station according to the present embodiment.

FIG. 6 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

Note that the transmitting/receiving sections 103 may further include an analog beamforming section to perform analog beamforming. The analog beamforming section may be constituted with an analog beamforming circuit (for example, a phase shifter, a phase shift circuit) or an analog beamforming apparatus (for example, a phase shift apparatus) that can be described based on general understanding of the technical field to which the present invention pertains. For example, the transmitting/receiving antennas 101 may be constituted with an array antenna.

Figure 7:
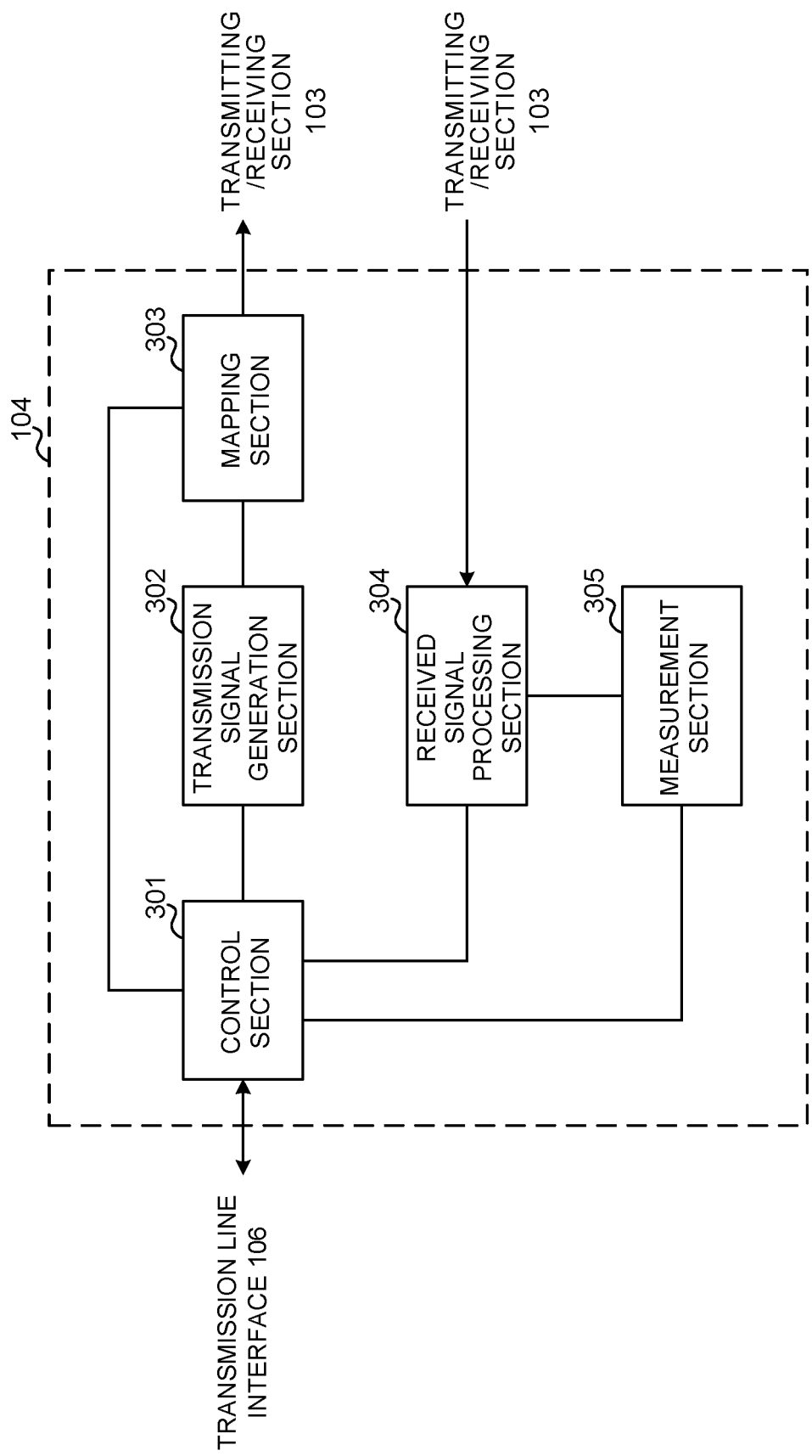
FIG. 7 is a diagram to show an example of a functional structure of the radio base station according to the present embodiment.

FIG. 7 is a diagram to show an example of a functional structure of the radio base station according to the present embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource allocation) of system information, a downlink data signal (for example, a signal transmitted in the PDSCH), a downlink control signal (for example, a signal transmitted in the PDCCH, delivery confirmation information, and the like). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), SSB, a downlink reference signal (for example, CRS, CSI-RS, DMRS), and so on.

The control section 301 controls the scheduling of an uplink data signal (for example, a signal transmitted in the PUSCH), an uplink control signal (for example, a signal transmitted on the PUCCH and/or the PUSCH, delivery confirmation information, and the like), a random access preamble (for example, a signal transmitted on the PRACH), an uplink reference signal, and the like.

The control section 301 may perform control to form a transmission beam and/or received beam by using digital BF (for example, precoding) in the baseband signal processing section 104 and/or analog BF (for example, phase rotation) in the transmitting/receiving sections 103. The control section 301 may perform control to form a beam, based on downlink channel information, uplink channel information, and the like. These pieces of channel information may be acquired from the received signal processing section 304 and/or the measurement section 305.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

Note that the transmitting/receiving sections 103 transmit an RRC (Radio Resource Control) reconfiguration message including information about reconfiguration with sync. The information about the resources for the random access may include information for associating an index of each synchronization signal block and an index of each random access preamble. The information about the resources for the random access may include information for associating an index of a resource for each channel state information reference signal and an index of each random access preamble.

Also, the transmitting/receiving sections 103 may transmit at least one of a master information block or a system information block (for example, SIB1). The control section 301 may control the configuration of the control resource set.

<User Terminal>

Figure 8:
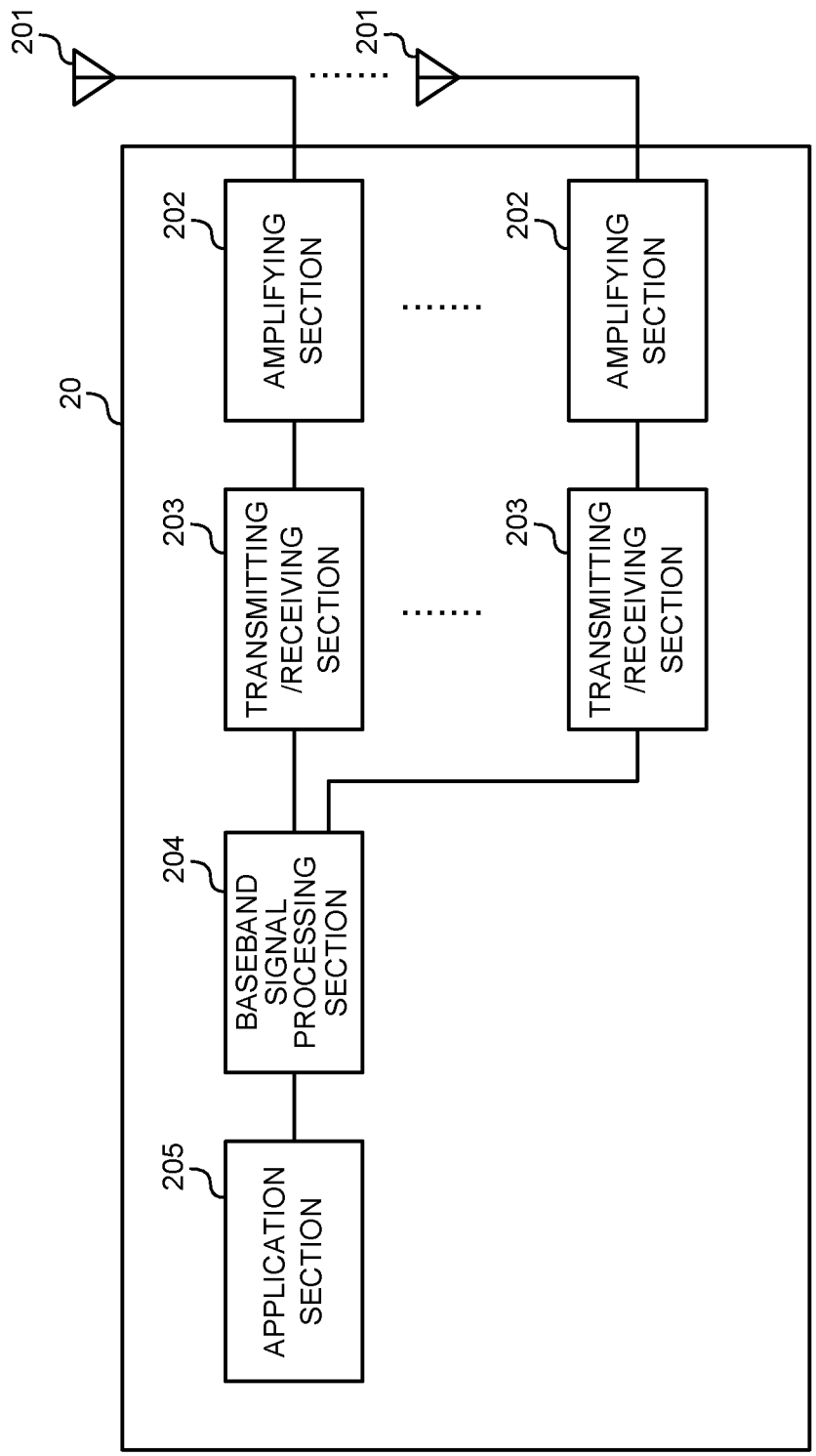
FIG. 8 is a diagram to show an example of an overall structure of the user terminal according to the present embodiment.

FIG. 8 is a diagram to show an example of an overall structure of the user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that the transmitting/receiving sections 203 may further include an analog beamforming section to perform analog beamforming. The analog beamforming section may be constituted with an analog beamforming circuit (for example, a phase shifter, a phase shift circuit) or an analog beamforming apparatus (for example, a phase shift apparatus) that can be described based on general understanding of the technical field to which the present invention pertains. Also, for example, the transmitting/receiving antennas 201 may be constituted with an array antenna.

Figure 9:
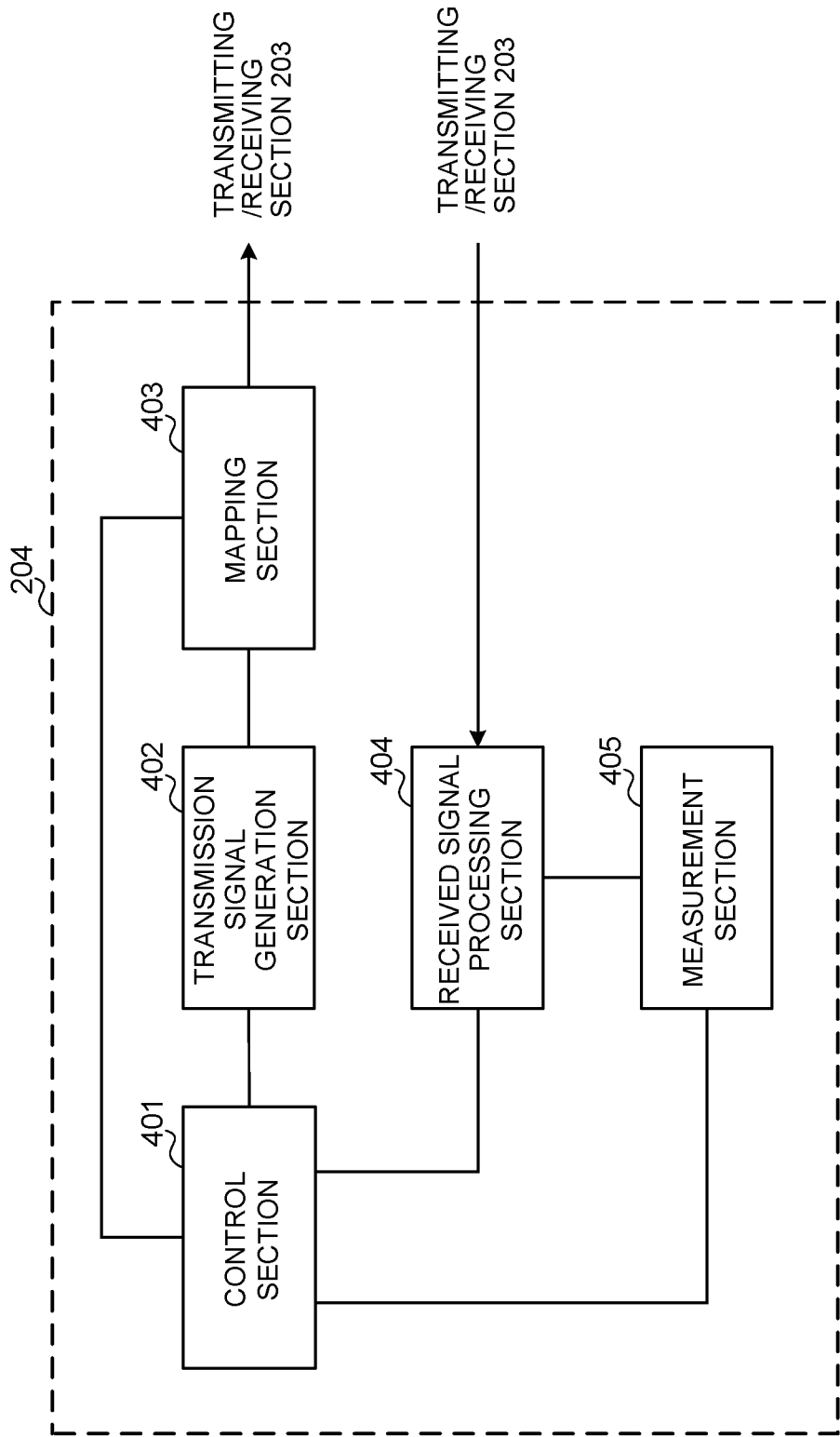
FIG. 9 is a diagram to show an example of a functional structure of the user terminal according to the present embodiment.

FIG. 9 is a diagram to show an example of a functional structure of the user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may perform control to form a transmission beam and/or received beam by using digital BF (for example, precoding) in the baseband signal processing section 204 and/or analog BF (for example, phase rotation)

in the transmitting/receiving sections 203. The control section 401 may perform control to form a beam, based on downlink channel information, uplink channel information, and the like. These pieces of channel information may be acquired from the received signal processing section 404 and/or the measurement section 405.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about delivery confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. For example, the measurement section 405 may perform intra-frequency measurement and/or inter-frequency measurement for one or both of the first carrier and the second carrier. In a case that the serving cell is included in the first carrier, the measurement section 405 may perform inter-frequency measurement in the second carrier, based on the measurement indication acquired from the received signal processing section 404. The measurement section 405 can be constituted with a measurer, a measurement circuit or a measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

Note that the transmitting/receiving sections 203 receive an RRC (Radio Resource Control) reconfiguration message including information about reconfiguration with sync. The information about the resources for the random access may include information for associating an index of each synchronization signal block and an index of each random access preamble. The information about the resources for the random access may include information for associating an index of a resource for each channel state information reference signal and an index of each random access preamble.

Also, the transmitting/receiving sections 203 may receive at least one of a master information block or a system information block (for example, SIB1).

The control section 401 may control quasi-co-location about a control resource set, based on information about resources for random access in the information about the reconfiguration.

Specifically, the control section 401 may assume that an antenna port of a demodulation reference signal of a downlink control channel in the control resource set is quasi-co-located to a synchronization signal block of a certain index specified by the information for associating an index of each synchronization signal block and an index of each random access preamble (first aspect).

The control section 401 may assume that an antenna port of a demodulation reference signal of a downlink control channel in the control resource set is quasi-co-located to a synchronization signal block quasi-co-located to a resource for a channel state information reference signal of a certain index specified by the information for associating an index of a resource for each channel state information reference signal and an index of each random access preamble (second aspect).

The control section 401 may configure the control resource set, based on an index in a master information block or a system information block.

<Hardware Structure>

Note that the block diagrams that have been used to describe the above embodiments show blocks in functional units. These functional blocks (components) may be implemented in arbitrary combinations of at least one of hardware and software. The method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 10:
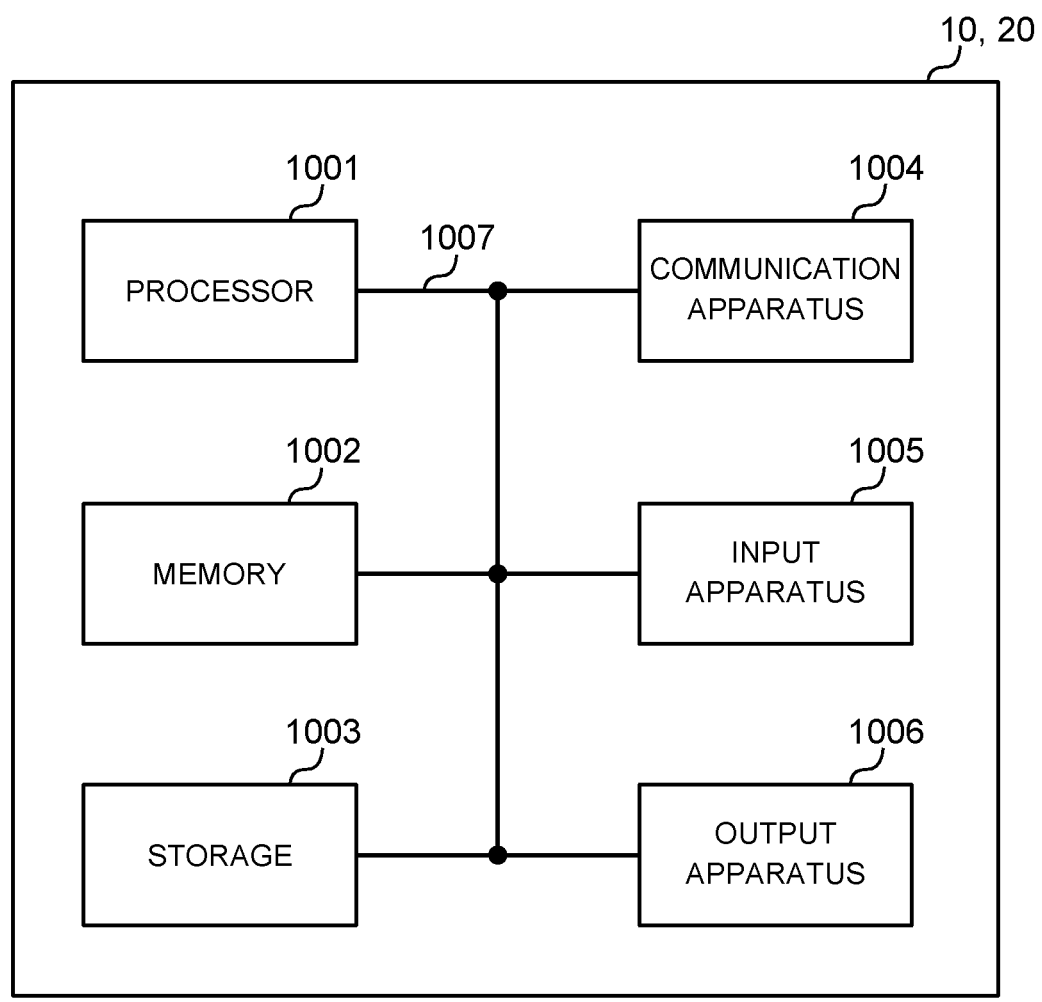
FIG. 10 is a diagram to show an example of a hardware structure of the radio base station and the user terminal according to the present embodiment.

For example, a radio base station, a user terminal, and so on according to one embodiment of the present disclosure may function as a computer that executes the processes of the radio communication method of the present disclosure. FIG. 10 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information block (SIB), and so on), MAC (Medium Access Control) signaling and so on), and other signals or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as "precoding," a "precoder," a "weight (precoding weight)," "transmission power," "phase rotation," an "antenna port," a "layer," the "number of layers," a "rank," a "beam," a "beam width," a "beam angle," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation.

Furthermore, the radio base station in the present disclosure may be interpreted as a user terminal. For example, each aspect/embodiment of the present disclosure may be applied to the structure that replaces a communication between a radio base station and a user terminal with a communication between a plurality of user terminals (for example, which may be referred to as "D2D (Device-to-Device)," "V2X (Vehicle-to-Everything)," and the like). In this case, the user terminals 20 may have the functions of the radio base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as a radio base station. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives a radio resource control (RRC) reconfiguration message including information regarding reconfiguration with synchronization; and
a processor that assumes that a demodulation reference signal antenna port for a downlink control channel in a control resource set is quasi co-located with a synchronization signal block of an index identified in information regarding random access resources within the information regarding the reconfiguration with synchronization, wherein the processor selects the synchronization signal block, from a plurality of synchronization signal blocks, based on a received power of the synchronization signal block, and wherein the processor configures lower layers according to common configuration information about a special cell, when the RRC reconfiguration message includes the common configuration information about the special cell.

2. The terminal according to claim 1, wherein the processor controls a transmission of a random access preamble associated with the synchronization signal block.

3. The terminal according to claim 1, wherein the processor assumes that the demodulation reference signal antenna port is quasi co-located with a channel state information reference signal resource of an index identified in the information regarding random access resources.

4. The terminal according to claim 3, wherein the processor controls a transmission of a random access preamble associated with the channel state information reference signal resource.

5. A radio communication method for a terminal comprising:
receiving a radio resource control (RRC) reconfiguration message including information regarding reconfiguration with synchronization;
assuming that a demodulation reference signal antenna port for a downlink control channel in a control resource set is quasi co-located with a synchronization signal block of an index identified in information regarding random access resources within the information regarding the reconfiguration with synchronization;
configuring lower layers according to common configuration information about a special cell, when the RRC reconfiguration message includes the common configuration information about the special cell, and
selecting the synchronization signal block, from a plurality of synchronization signal blocks, based on a received power of the synchronization signal block.

6. A base station comprising:
a processor that controls to include, in information regarding reconfiguration with synchronization, information regarding random access resources for a terminal to assume a quasi co-location of a demodulation reference signal antenna port for a downlink control channel in a control resource set; and a transmitter that transmits a radio resource control (RRC) reconfiguration message including the information regarding the reconfiguration with synchronization to the terminal, wherein the terminal assumes that the demodulation reference signal antenna port is quasi co-located with a synchronization signal block of an index identified in the information regarding random access resources, wherein the synchronization signal block is selected, from a plurality of synchronization signal blocks, based on a received power of the synchronization signal block, and wherein the processor configures lower layers according to common configuration information about a special cell, when the RRC reconfiguration message includes the common configuration information about the special cell.

7. A system comprising:
a terminal that comprises:
a receiver that receives a radio resource control (RRC) reconfiguration message including information regarding reconfiguration with synchronization; and
a processor of the terminal that assumes that a demodulation reference signal antenna port for a downlink control channel in a control resource set is quasi co-located with a synchronization signal block of an index identified in information regarding random access resources within the information regarding the reconfiguration with synchronization,
wherein the processor of the terminal selects the synchronization signal block, from a plurality of synchronization signal blocks, based on a received power of the synchronization signal block, and
wherein the processor of the terminal configures lower layers according to common configuration information about a special cell, when the RRC reconfiguration message includes the common configuration information about the special cell, and
a base station that comprises:
a processor of the base station that controls to include, in the information regarding the reconfiguration with synchronization, the information regarding random access resources; and
a transmitter that transmits the RRC reconfiguration message to the terminal.

* * * * *